GAIN STABILIZED INTERMEDIATE FREQUENCY TRANSFORMER

Filed May 6, 1955

INVENTOR.
JOHN F. CLEMENS.
BY Alden D. Redfield.
Charles M. Hogan.
ATTORNEYS.

2,845,600

GAIN STABILIZED INTERMEDIATE FREQUENCY TRANSFORMER

John Forrest Clemens, Cincinnati, Ohio, assignor to Avco Manufacturing Corporation, Cincinnati, Ohio, a corporation of Delaware Application May 6, 1955, Serial No. 506,421

1 Claim. (Cl. 333—78)

The present invention relates generally to intermediate frequency (I. F.) signal transformers and specifically provides an I. F. transformer of particularly stable gain and uniform bandwidth characteristics which, in the preferred embodiment herein shown, satisfies rigorous stability requirements at a medium frequency, such as 6,900 kilocycles (kc.).

Electronic engineers are generally familiar with the problem of maintaining frequency stability in I. F. transformer circuits. A more difficult and less familiar problem is posed by the preservation of uniform gain characteristics over a wide temperature range. In many types of communication equipment, wide changes in gain (such as a 25% variation within a 100° centigrade temperature range) are neglected, even though the use of three transformers in cascaded stages may occasion an over-all gain change on the order of 6 db. On the other hand, gain stability is of major importance in an application such as a marker beacon receiver, for example. In such devices, the operation of which is premised on the making of an indication when a received signal reaches a predetermined level, the sensitivity of the receiver and gain of the I. F. transformers must be independent of environmental influence, such as temperature changes from —55° to 71° centigrade (C.). This is the major problem to which the invention is directed. A related problem is the maintenance of band pass characteristics throughout this range.

Various attempts to meet these requirements have involved the utilization of resonant circuits featuring composition resistors and inductively coupled slug-tuned coils. Such systems fail to meet the requirements and display a radical increase in gain at low temperatures, resulting in large measure from two effects: (1) The impedance looking into either primary or secondary, being proportional to Q, increases at low temperatures; (2) The coefficient of coupling, also a function of Q, increases at low temperatures. Tests on a receiver using such conventional transformer circuits showed an increase in sensitivity of 6 db when the temperature was decreased by 100° C. The gain of each of the three transformers in such receiver increased by a factor of 1.28 during this temperature change. Such conventional approaches were, therefore, found entirely inadequate to meet the rigorous requirements of a marker beacon receiver.

A primary performance objective of the invention is to provide a transformer having extremely stable gain and bandpass characteristics over a wide range of ambient temperatures. In one practical embodiment of the invention, suitable for use at an intermediate frequency of 6,900 kilocycles and having a bandwidth of 140 kilocycles at 2 db down and 575 kilocycles at 20 db down, tests with equipment capable of detecting departures within 5% showed no measureable gain variation and no bandwidth change over the temperature range mentioned above.

In this specific application the I. F. transformer primary and secondary windings were required, as loaded, to have Q's of 50.

A major structural object of the invention is to provide a transformer comprising two capacitively coupled resonant circuits, each including a toroidal coil and capacitance and a stable loading resistor, the resonant impedance of each coil and associated capacitance having ohmic values on the order of 300% of the value of the associated shunting or loading resistor so that in each case the resistor predominates in determining the effective temperature coefficient of the Q of the coil as loaded, and so that the greater stability of the resistor may be exploited. Bearing in mind that the temperature coefficient of the winding Q in a conventional slug-tuned solenoid system approximated —0.233% per degree centigrade, as contrasted with corresponding coefficients of —0.077% per degree centigrade and —0.03% per degree centigrade, which characterize the toroidal coil and loading resistor herein employed, respectively, it will be seen that the use of this combination of expedients is helpful in attaining the primary object of the invention.

For a better understanding of the present invention, together with other and further objects, advantages and capabilities thereof, including its compactness, reliability, simplicity of construction and light weight, reference is made to the following description of the accompanying drawings, in which.

Figure 4:
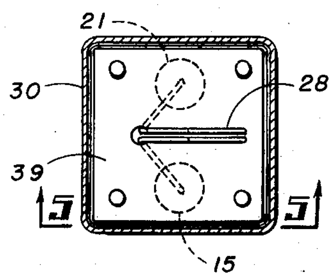
Figure 6:
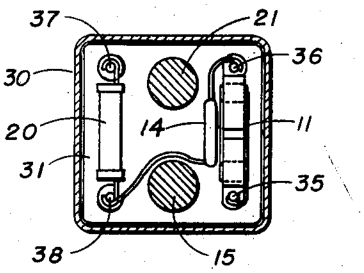
Figure 2:
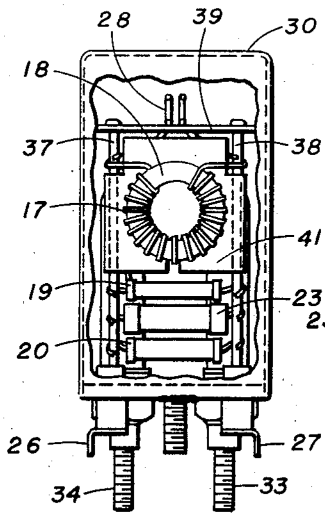
Figs. 2 and 3 are front and rear elevational sectional views of my novel transformer unit, with the case shown as partially broken away to facilitate graphic presentation.
Figure 5:
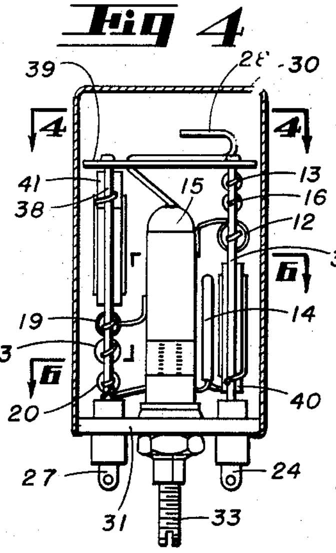
Figure 3:
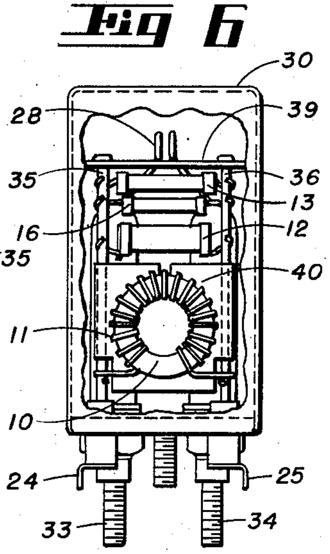
Figures 1, 7:
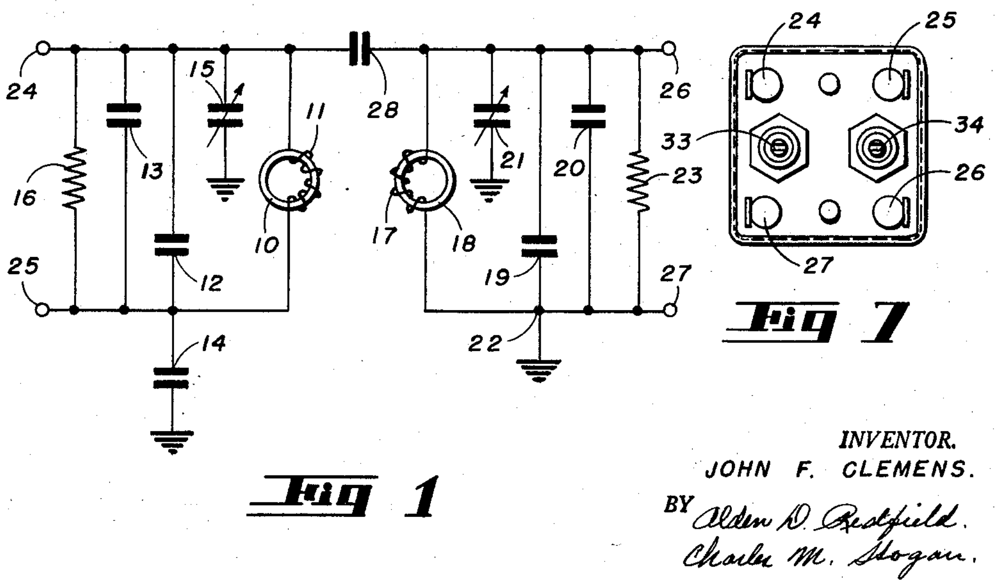
Fig. 1 is a schematic diagram of a transformer circuit in accordance with the invention.

Figs. 4, 5 and 6 are, respectively, sectional, elevational sectional, and sectional views taken severally along the section lines 4—4, 5—5, and 6—6, in each case looking in the direction of the arrows; and Fig. 7 is a bottom view of the transformer unit.

Referring now specifically to Fig. 1, the preferred embodiment of the invention comprises the circuitry now discussed. Mounted on a toroidal powdered iron coil form 10 is a primary winding 11 which is tuned to resonance at the desired frequency by a group of capacitors in parallel, inclusive of a fixed capacitor 12, a fixed capacitor 13 and a series sub-combination of fixed capacitor 14 and trimmer capacitor 15, one terminal of each of capacitors 14 and 15 being grounded. The Q of the winding alone at 6,900 kilocycles approximates 150. In shunt with this primary circuit is a loading resistor 16 of the boron-carbon film type, per se well known for its remarkable low temperature coefficient.

The secondary circuit is arranged in a generally similar manner. It comprises an inductive winding 17 mounted on a toroidal powdered iron form 18 and tuned to resonance at the desired frequency by a similar group of fixed capacitors 19 and 20 and a trimmer capacitor 21, one terminal of each of which is grounded at 22. For loading purposes there is provided a boron-carbon film type resistor 23 in shunt with the resonant circuit.

The primary circuit is connected to input terminals 24 and 25 and the secondary circuit is similarly brought out to output terminals 26 and 27.

The primary and secondary circuits are coupled capacitively to an extent slightly less than critical by a suitable capacitance 28.

While I do not wish to be limited to the specific parameters herein mentioned, which are generally illustrative rather than exhaustive, I mention the following by way of exposition of a practical embodiment of the invention:

| Element: | Value |
|---|---|
| Resistor 16 | 30,000 oms. |
| Capacitor 13 | 33 micromicrofarads. |
| Capacitor 12 | 15 micromicrofarads. |
| Capacitor 15 | 1–12 micromicrofarads, adjustable. |
| Capacitor 28 | 1 micromicrofarad. |
| Coil forms | Each stackpole grade G–2 powdered iron. |
| Capacitor 14 | 0.0022 microfarad. |
| Capacitor 21 | 1–12 micromicrofarads, adjustable. |
| Capacitor 19 | 15 micromicrofarads. |
| Capacitor 20 | 30 micromicrofarads. |
| Resistor 23 | 25,000 ohms. |

In accordance with the invention, I not only mount the primary and secondary windings on the toroidal coil forms shown and couple them capacitively in the manner indicated, but I provide stable loading resistors having such parameters that the resonant impedance of the tuned circuit formed by the coil and capacitance of each circuit has an ohmic value on the order of 300% of the value of its respective shunting or loading resistor.

Referring now to the mechanical construction of an intermediate frequency transformer in accordance with the invention, there is provided a conventional metallic casing 30 which suitably engages a metallic base member 31, the latter being appropriately apertured and tailored by suitable design expedients to provide for the mounting of the input and output terminals and the projecting adjusting mechanisms 33 and 34 of trimmer capacitors 15 and 21, respectively. Electrically secured to the terminals and base and projecting upwardly from the base are four metallic conductive posts or slender bus bars 35, 36, 37 and 38, each of which projects through an insulating board 39 at its end remote from the metallic base 31.

Components 12, 16 and 13 are suspended between and terminated by bars 35 and 36. Similarly, components 19, 20 and 23 are secured by their leads to bars 37 and 38. Capacitor 14 is held by its leads in position behind board 40, as shown.

Capacitor 28 comprises a loop-shaped portion of twin lead, the spaced individual conductors of which are severally conductively connected to the end terminals of trimmer capacitors 15 and 21, a portion of the twin-lead section 28 reposing on board 39, as shown. The primary and secondary windings and forms 10—11 and 17—18, respectively, are press-fitted into suitable apertures in insulating boards 40 and 41, respectively, the latter being slotted at their edges to facilitate mounting with engagement between portions of posts or bus bars. For example, form 10, as shown in Fig. 6 is mounted between posts 35 and 36 with rigid engagement.

In order to discriminate against undesired stray signals, board 40 is mounted with its bottom edge closely adjacent base 31, and board 41 is mounted with its top edge closely adjacent board 39, so that inductance 17—18 is not only spaced from, but is mounted at a higher vertical level in relation to inductance 10—11.

Experiment has demonstrated that an intermediate frequency transformer having the parameters and mechanical construction herein disclosed satisfies the objects of the invention and manifests the desired characteristics discussed above.

While I have shown and described what is at present considered to be a preferred form of the invention and one particular embodiment thereof, it will be understood by those skilled in the art that various modifications may be introduced therein without departing from the proper scope of the invention as defined by the claim appended hereto.

Having fully disclosed my invention, I claim:

A fixed-tuned intermediate frequency transformer system comprising a base, a conductive shield secured to the base in complementary fashion to provide an enclosure, two pairs of terminals projecting through the base, one pair being disposed on one side as primary input circuit terminals and other pair being disposed on the other side as secondary output circuit terminals, four conductive mounting posts individually secured to said terminals and positioned perpendicular to said base to provide mountings for the primary and secondary circuits, a parallel combination of a toroidal coil and a loading resistor and at least one capacitor electrically connected to and mechanically spanning the input circuit posts to provide a primary resonant circuit, the primary coil being located adjacent the base, a parallel combination of a toroidal coil and a loading resistor and at least one capacitor electrically coupled to and mechanically spanning the output circuit posts to provide a secondary resonant circuit, the secondary coil being located remote from the base, said resistors being of the boron-carbon film type and each having an ohmic value on the order of one-third of the resonant impedance of its associated coil and capacitance, two coil-supporting boards formed with apertures therein and individually secured between the input and output pairs of posts, each coil having a powdered-iron core and being mounted in one of said apertures so that the coils are disposed geometrically in parallel to each other, primary and secondary circuit trimmer capacitors extending parallel to said posts and mounted with their axes in a central plane between said coils, said trimmer capacitors having high potential terminals and also having adjusting screws projecting through said base, and a capacitor for coupling said primary and secondary tuned circuits, the last-named capacitor comprising a section of twin lead having connectors connected to the high potential terminals of said trimmer capacitors, whereby there is provided a stable double-tuned filter unit having uniform gain and pass-band characteristics over a temperature range from —55° to 71° centigrade.

References Cited in the file of this patent

UNITED STATES PATENTS

| | | |
|---|---|---|
| 1,730,903 | Schmidt et al. | Oct. 8, 1929 |
| 2,082,587 | Meinema | June 1, 1937 |
| 2,519,009 | Wolfe | Aug. 15, 1950 |
| 2,622,157 | McGuire et al. | Dec. 16, 1952 |
| 2,728,052 | Van Duyne | Dec. 20, 1955 |